US006753987B1

(12) United States Patent
Farnung et al.

(10) Patent No.: US 6,753,987 B1
(45) Date of Patent: Jun. 22, 2004

(54) SYSTEMS AND METHODS TO DETERMINE A CONTRAST AND A BRIGHTNESS ADJUSTED SYSTEM TONE REPRODUCTION CURVE

(75) Inventors: Charles E. Farnung, Irondequoit, NY (US); Ramesh Nagarajan, Fairport, NY (US); Francis Tse, Rochester, NY (US); Julie A. Fisher, Rochester, NY (US); Regina M. Loverde, Webster, NY (US); Ralph H. Huedepohl, Bloomfield, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/512,888

(22) Filed: Feb. 25, 2000

(51) Int. Cl.[7] .............................. G03F 3/08; H04N 1/46
(52) U.S. Cl. ....................................... 358/518; 358/520
(58) Field of Search .............................. 345/600, 150, 345/153, 147, 154, 589, 603; 348/179, 655; 358/504, 518, 448, 520, 519, 1.9, 515, 517, 537, 452; 382/167

(56) References Cited

U.S. PATENT DOCUMENTS 4,071,911 A    1/1978  Mazur 4,086,434 A    4/1978  Bocchi (List continued on next page.)

FOREIGN PATENT DOCUMENTS

EP    0 854 632    7/1998

OTHER PUBLICATIONS

"Remote Diagnostics Systems," Paul F. Morgan, Xerox Disclosure Journal, vol. 3, No. 3, May/Jun. 1978, pp. 191–192.

(List continued on next page.)

Primary Examiner—Mark Wallerson
Assistant Examiner—Thomas J. Lett
(74) Attorney, Agent, or Firm—Oliff & Berridge, PLC

(57) ABSTRACT

Contrast and brightness adjustments can be made to a system tone reproduction curve. These contrast and brightness adjustments can be made, for example, by user, via a user input device, or alternatively, automatically detected, based on an image analysis routine. By determining one or more generic tone reproduction curves, and interpolating these tone reproduction curves with the system tone reproduction curve, a new, adjusted tone reproduction curve is produced. This allows for a determination of the adjusted system tone reproduction curve as opposed to calculating and restoring the families of system tone reproduction curves adjusted for all the possible combinations of contrast and brightness.

13 Claims, 16 Drawing Sheets

U.S. PATENT DOCUMENTS

| | | | |
|---|---|---|---|
| 4,583,834 A | | 4/1986 | Seko et al. |
| 5,038,319 A | | 8/1991 | Carter et al. |
| 5,057,866 A | | 10/1991 | Hill, Jr. et al. |
| 5,084,875 A | | 1/1992 | Weinberger et al. |
| 5,121,195 A | * | 6/1992 | Seki et al. ............... 358/515 |
| 5,365,310 A | | 11/1994 | Jenkins et al. |
| 5,436,734 A | | 7/1995 | Yamauchi et al. |
| 5,510,876 A | | 4/1996 | Hayashi et al. |
| 5,510,896 A | | 4/1996 | Wafler |
| 5,580,177 A | | 12/1996 | Gase et al. |
| 5,612,902 A | | 3/1997 | Stokes |
| 5,619,307 A | | 4/1997 | Machino et al. |
| 5,642,202 A | | 6/1997 | Williams et al. |
| 5,680,541 A | | 10/1997 | Kurosu et al. |
| 5,694,528 A | | 12/1997 | Hube |
| 5,727,135 A | | 3/1998 | Webb et al. |
| 5,748,221 A | | 5/1998 | Castelli et al. |
| 5,761,505 A | | 6/1998 | Golson et al. |
| 5,884,118 A | | 3/1999 | Mestha et al. |
| 5,892,451 A | | 4/1999 | May et al. |
| 5,893,083 A | | 4/1999 | Eshghi et al. |
| 6,023,525 A | | 2/2000 | Cass |
| 6,023,595 A | | 2/2000 | Suzuki et al. |
| 6,480,202 B1 | * | 11/2002 | Deguchi et al. ............ 345/600 |
| 6,614,456 B1 | * | 9/2003 | Rzepkowski et al. ....... 345/833 |

OTHER PUBLICATIONS

"Real Time Fault Monitoring of Industrial Processes," Chapter 4.2.2.—Event–based architecture for real–time fault diagnosis, A.D. Pouliezos et al., Kluwer Academic Publishers, 1994, pp. 284–287.

"Fault Diagnosis in Dynamic Systems Using Analytical and Knowledge–based Redundancy—A Survey and Some New Results," Paul M. Frank, Automatica, vol. 26, 90 International Federation of Automatic Control, 1990, pp. 459–474.

"Combining Expert System and Analytical Redundancy Concepts for Fault Tolerant Flight Control," David A. Handelman et al., Princeton University, J. Guidance, vol. 12, No. 1, Jan.–Feb. 1989, pp. 39–45.

* cited by examiner

SYSTEMS AND METHODS TO DETERMINE A CONTRAST AND A BRIGHTNESS ADJUSTED SYSTEM TONE REPRODUCTION CURVE

BACKGROUND OF THE INVENTION

1. Field of Invention

This invention is related to image processing systems. In particular, this invention is directed toward systems and methods that determine a contrast and a brightness adjusted tone reproduction curve.

2. Description of Related Art

An image processing system tone reproduction curve (TRC) represents what the image processing portion of the system should output in gray level given a particular gray level input. The tone reproduction curve is derived from combining the characteristics of other portions of the system. In particular, the tone reproduction curve is based on characteristics of the image input terminal (IIT), image output terminal (IOT) and system tone reproduction curves. The resulting image processing system tone reproduction curve compensates for the image input terminal and image output terminal characteristics to arrive at the desired system output. In particular, image processing system tone reproduction curves are created during the product development phase and stored in data files on the actual device, or, for example, in the accompanying driver or software files. Therefore, each possible mode and each possible combination of image adjustment, such as contrast and brightness, has an associated image processing system tone reproduction curve stored in a data file. The data file corresponding to the image input terminal information and the image output terminal information is then referenced and applied by the image processing sub-system to the input image information.

SUMMARY OF THE INVENTION

The systems and method of co-pending Attorney Docket No. 105423, filed herewith and incorporated herein by reference in its entirety, discloses how to determine a tone reproduction curve based on current image input terminal and image output terminal information. However, the systems and methods determine their adjusted tone reproduction curve based on a static, or generic, system reproduction curve.

The systems and methods of this invention allow for an adjusted system tone reproduction curve. In particular, the systems and methods of this invention allow contrast and brightness adjustments to be made to the system tone reproduction curve. These contrast and brightness adjustments can be made, for example, by user, via a user input device, or alternatively, automatically detected, based on an image analysis routine. By determining one or more generic tone reproduction curves, and cascading these tone reproduction curves with the system tone reproduction curve, a new, adjusted tone reproduction curve is produced. This allows for a determination of the adjusted system tone reproduction curve as opposed to calculating and restoring the families of system tone reproduction curves adjusted for all the possible combinations of contrast and brightness.

Therefore, a user can be given the ability to provide their own system tone reproduction curves, and then make any contrast and/or brightness adjustments. In particular, the systems and methods of this invention determine two simple "generic" tone reproduction curves. The first of these generic tone reproduction curves is based on a predetermined contrast setting. The second of these tone reproduction curves is based on a predetermined brightness setting. The two generic tone reproduction curves are then adjusted based on received contrast and/or brightness information. The adjusted tone reproduction curves are then smoothed and cascaded with the system tone reproduction curves. An image processing tone reproduction curve based on one or more of a system tone reproduction curve and a printer tone reproduction curve are then determined. This image processing tone reproduction curve is then forwarded to the image processing system as an adjusted tone reproduction curve for processing of the received image information, as disclosed in Attorney Docket No. 105423.

This invention provides systems and methods that determine a tone reproduction curve.

This invention separately provides systems and methods that determine an adjusted tone reproduction curve based on one or more of a contrast setting and a brightness setting.

This invention additionally provides systems and methods that provide a system tone reproduction curve which has been adjusted for contrast and brightness.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

The process used to adjust the system tone reproduction curve based on a contrast and a brightness value is as follows. Initially, a stored, or user specified, nominal system tone reproduction curve is retrieved. Additionally, contrast and brightness values, for example, selected by a user, or determined based on an image processing technique, are retrieved. Next, an initial contrast tone reproduction curve is determined. This initial contrast tone reproduction curve is adjusted, smoothed and cascaded with the system tone reproduction curve.

Next, an initial brightness tone reproduction curve is determined. Then, the initial brightness tone reproduction curve is adjusted, smoothed and cascaded with the system tone reproduction curve. An image processing tone reproduction curve is then determined based on the system tone reproduction curve and the output, e.g., the printer, tone reproduction curve.

Figure 1:
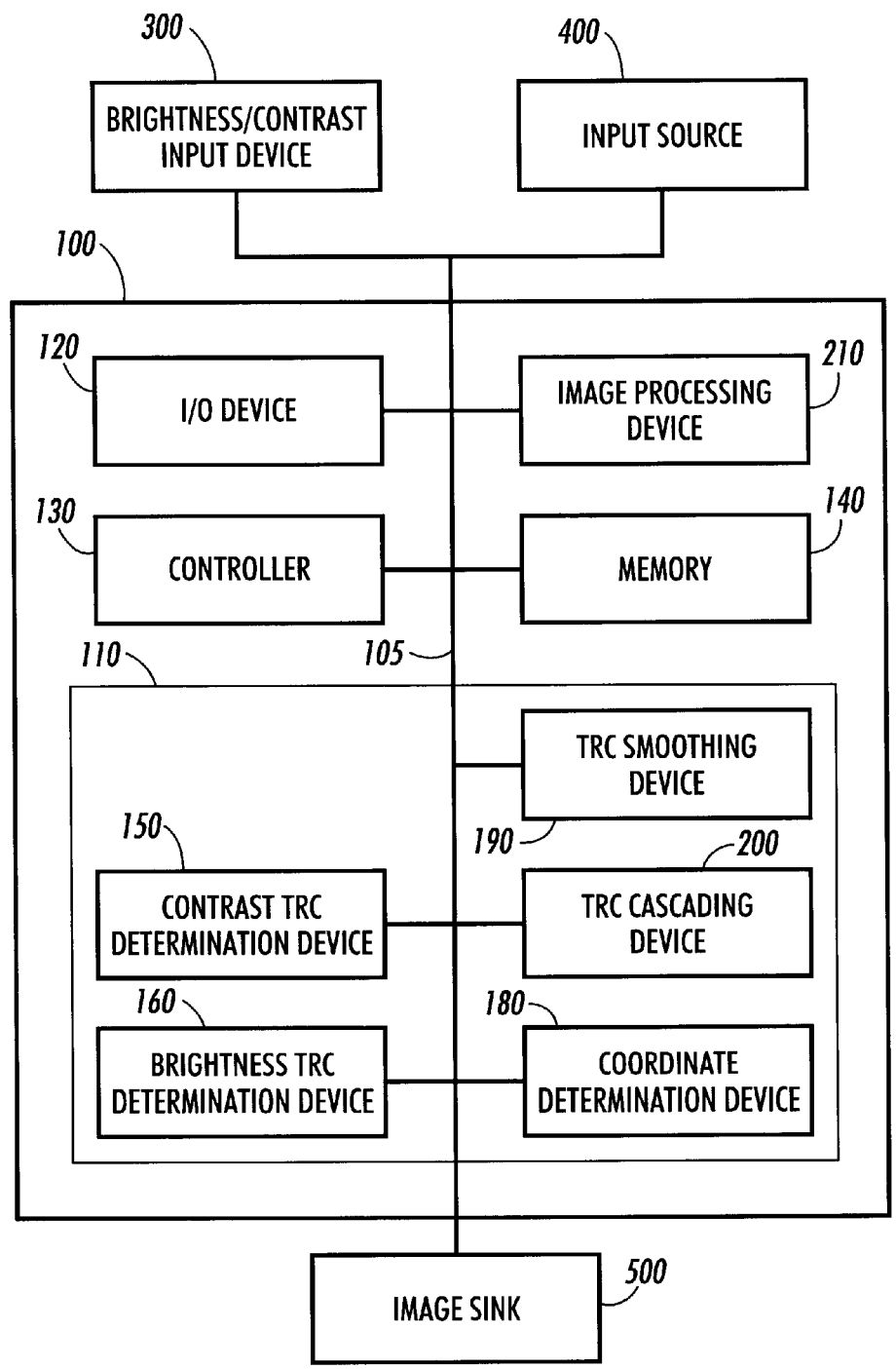
FIG. 1 is a functional block diagram showing an exemplary embodiment of an image processing system according to this invention.

FIG. 1 illustrates a functional block diagram of an image processing system 100 according to this invention. The image processing system 100 comprises an I/O device 120, a controller 130, a memory 140 which contains system information, received brightness/contrast values and is available to store nominal or generic system tone reproduction curve information, an image processing device 210, and a tone reproduction curve adjusting device 110 which in turn comprises a contrast tone reproduction curve determination device 150, a brightness tone reproduction curve determination device 160, a coordinate determination device 180, a tone reproduction curve smoothing device 190 and a tone reproduction curve cascading device 200, interconnected by a link 105. The image processing system 100 is also connected to one or more of a brightness/contrast input device 300, an image source 400 and an image sink 500.

The image source 400 can be any device that stores and/or generates an electronic version of an image.

Thus, the image can be a printed hard-copy version of the image, and the image source 400 can be a scanner that scans and outputs an electronic version of the image over the link 105 to the image processing system 100. Furthermore, the image source 400 and image processing system 100 can be elements integrated into a digital photocopier.

Similarly, the image source 400 can be a server or other node on a local area network, a wide area network, an intranet, the Internet, or any other distributing network. In this case, the image is already stored on the network in electronic form.

The image sink 500 receives the output of the image processing system 100. Thus, the resulting image received by the image sink 500 can be a printed or hard-copy version of the input image, and the image sink 500 can be a printer. Similarly, the image sink 500 can be a monitor which is capable of displaying an electronic version of the resulting image for viewing. Furthermore, the image source 400, the image processing system 100 and the image sink 500 can be elements integrated into a single device, such as a photocopier.

Similarly, the image sink 500 can be a server or other node on a local area network, a wide area network, an intranet, the Internet, or any other distributing network. In this case, the resulting image is transferred and stored on the network in electronic form.

The link 105 can be any wired or wireless link, or combination thereof, that supply image information between the connected elements. Thus, the image source 400 and the link 105 can be any known or later developed element(s) that are capable of supplying an electronic image to the image processing system 100. Furthermore, the image sink 500 and the link 105 can be any known or later developed element(s) that is capable of receiving an outputting or storing the resulting electronic image from the image processing system 100.

In operation an input image is received from image source 400 via link 105 and the I/O device 120 in the image processing system 100. Furthermore, a brightness/contrast value is received from the brightness/contrast input device 300, via link 105, and the I/O device 120 at the direction of controller 130. The received brightness/contrast values are then stored in memory 140.

Figure 2:
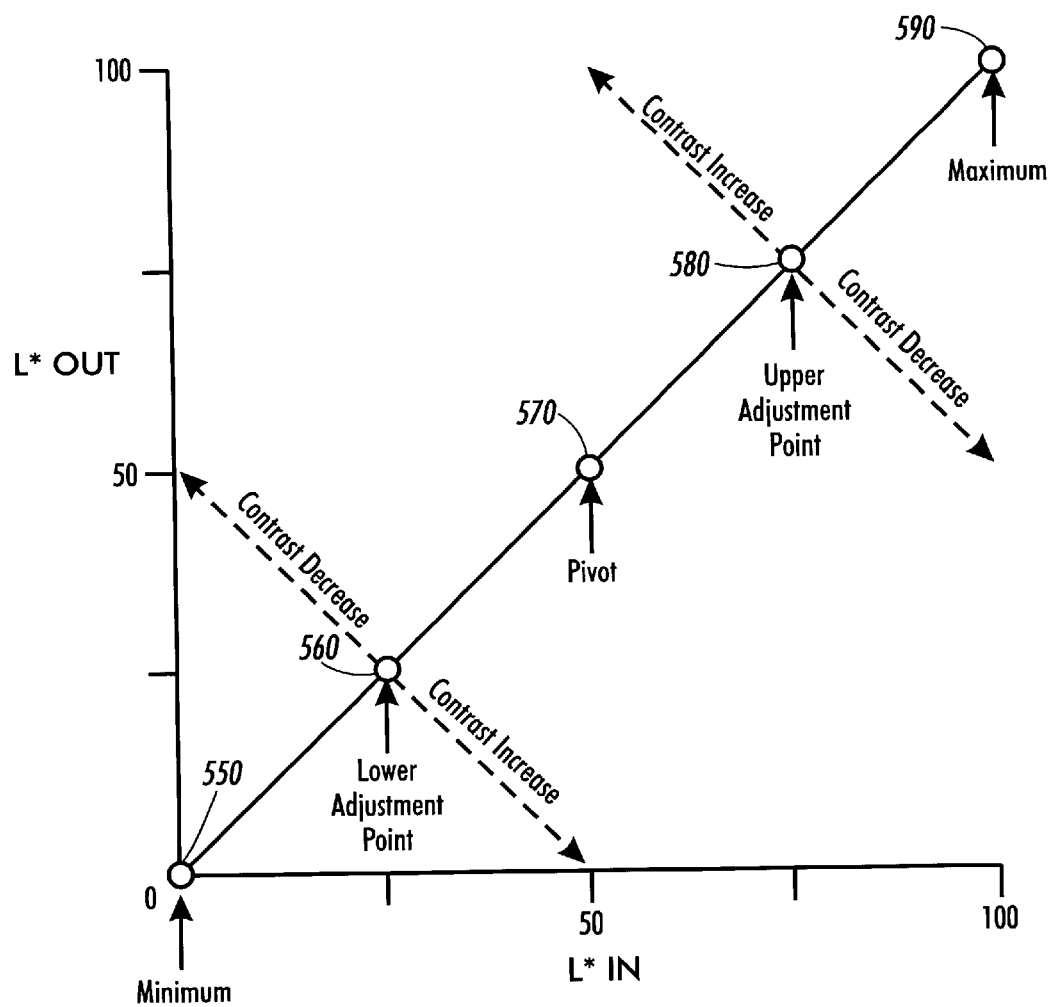
FIG. 2 is a plot showing the initial contrast tone reproduction curve.
Figure 3:
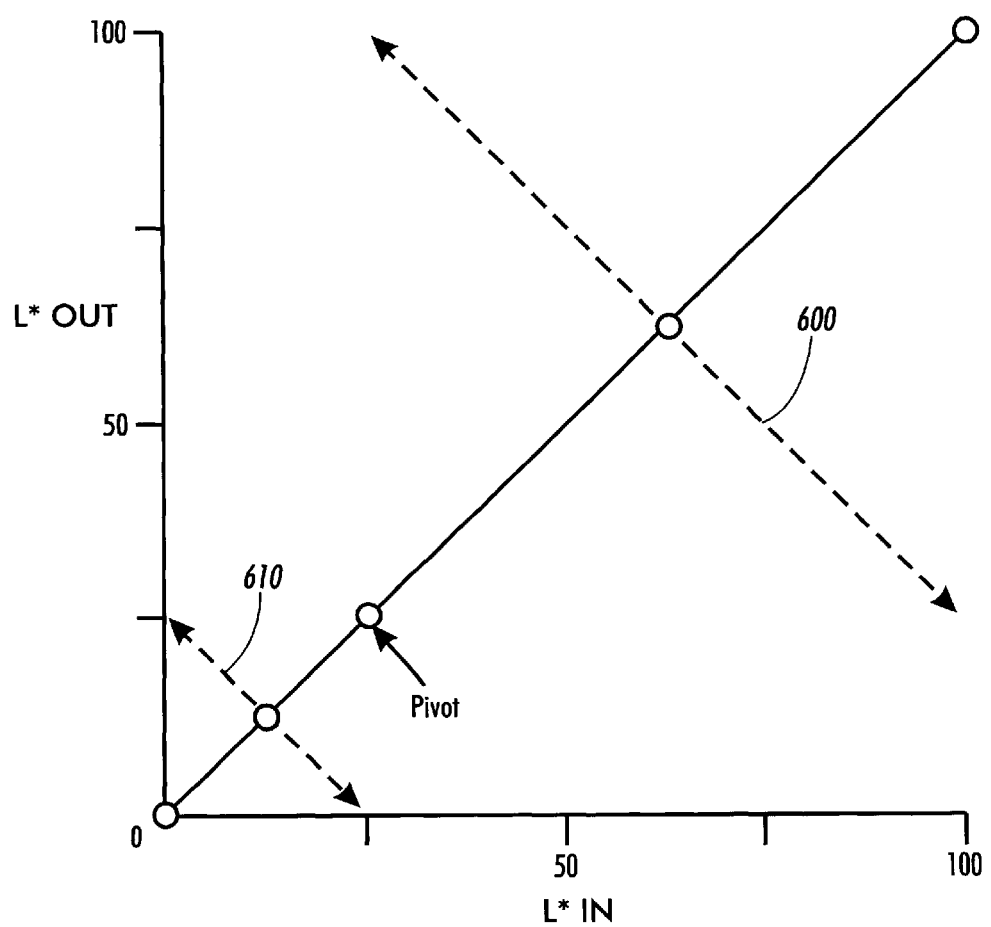
FIG. 3 is a plot illustrating the effects of placing the pivot point between 0 and 50 L*.

If a contrast adjustment is received from the brightness/contrast input device 300, the system tone reproduction curve is adjusted to compensate for this contrast value. In particular, the contrast reproduction curve determination device 150 determines an initial contrast tone reproduction curve. As shown in FIG. 2, the plot shows the five points created for the tone reproduction curve. In particular, a minimum point 550, a lower adjustment point 560, a pivot point 570, an upper adjustment point 580 and a maximum point 590. In this figure, the range of motion and the direction of motion, based on the received contrast values, are represented by the dotted lines passing through the upper and lower adjustment points. This initial contrast tone reproduction curve exemplarily comprises five points with a slope of 1. This initial contrast tone reproduction curve is based on units of L* which is the unit space used for the system tone reproduction curves. The minimum point 550 is the lowest input and output point on the tone reproduction curve and it is fixed at (0,0). The lower adjustment point 560 is directly manipulated by the contrast setting and it adjusts values between the minimum point 550 and the pivot point 570. The pivot point is a point that the tone reproduction curve will always pass through. This pivot point can be set to any value between 0 and 100 L*. The position of this pivot point depends on what range of values should be most affected by the contrast settings. By setting the pivot point between 0 and 50 L*, higher values of contrast are affected more than the lower values because of the range of motion in that area. In particular, FIG. 3 illustrates an exemplary plot where the pivot point is set to an arbitrary value between 0 and 100 L*. The line 600 illustrates the range of motion for the higher contrast values, and line 610 illustrates the range of motion for the lower contrast values.

Figure 4:
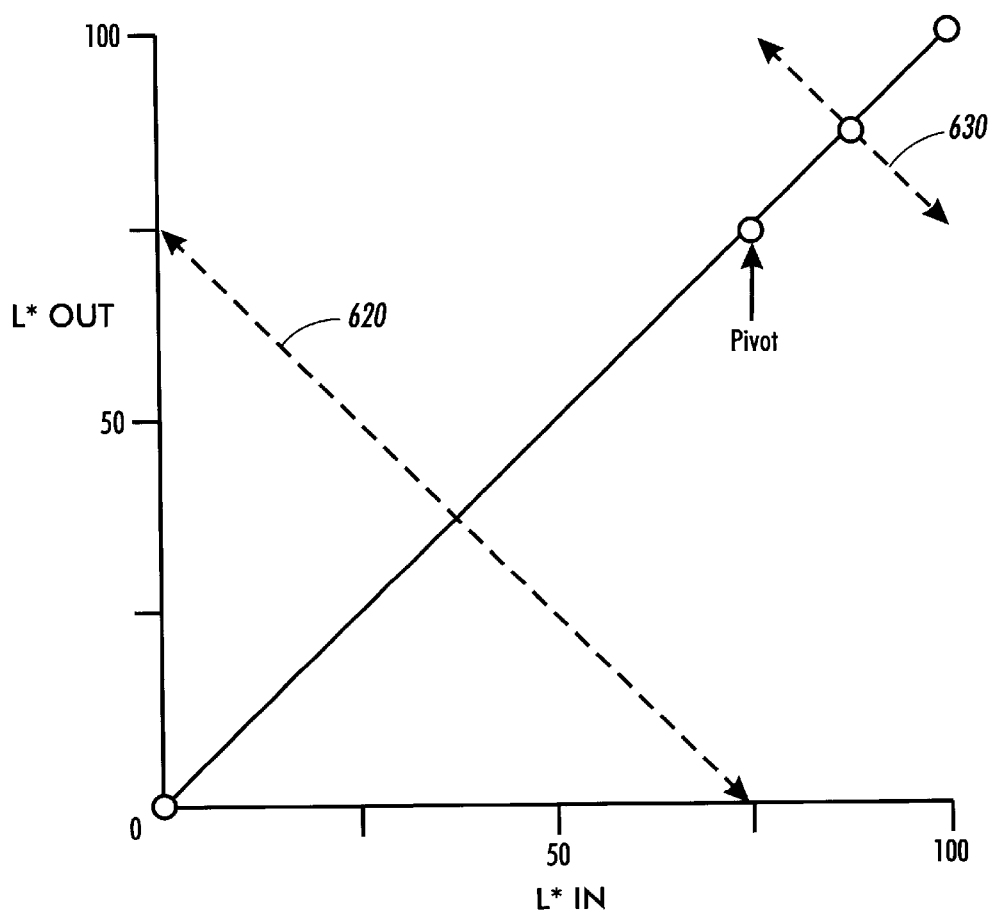
FIG. 4 is a plot illustrating the effects of placing the pivot points between 50 and 100 L*.

Setting the pivot point between 50 and 100 L, as illustrated in FIG. 4, causes the lower values to be affected more. In particular, line 620 illustrates the range of motion for lower contrast values, and line 630 illustrates the range of motion for higher contrast values. For ease of illustration in the following detailed description, the pivot point was arbitrarily set to (50, 50) so that both the lower and higher values are affected equally. However, it should be appreciated that the pivot point can be set anywhere within the range of 0 to 100 L.

The upper adjustment point is manipulated by the contrast values and it affects values between the pivot point and the maximum point. The maximum point is the highest input and highest output point on the tone reproduction curve and is fixed at (100, 100).

The coordinate determination device 180, in cooperation with controller 130 and memory 140, adjusts the initial contrast tone reproduction curve based on the received contrast values. In particular, the tone reproduction curve illustrated in FIG. 2 is adjusted by a contrast value, ranging, for example, from −10 to 10, where −10 is the minimum contrast level and 10 the maximum contrast level. The lower adjustment point is adjusted to the resulting x and y coordinates based on the following:

$$X'_L = X_L + \left[\left(\frac{\text{pivot} - X_L}{10}\right) \times \text{contrast}\right] \quad (1)$$

$$Y'_L = Y_L - \left[\left(\frac{\text{pivot} - Y_L}{10}\right) \times \text{contrast}\right] \quad (2)$$

And the upper adjustment point is adjusted in accordance with:

$$X'_U - X_U - \left[\left(\frac{X_U - \text{pivot}}{10}\right) \times \text{contrast}\right] \quad (3)$$

$$Y'_U - Y_U - \left[\left(\frac{Y_U - \text{pivot}}{10}\right) \times \text{contrast}\right] \quad (4)$$

where:
$X'_L$ and $Y'_L$ are the new x and y coordinates for the lower adjustment point,
$X'_U$ and $Y'_U$ are the new x and y coordinates of the upper adjustment point,
$X_L$ and $Y_L$ are the original x and y coordinates for the lower adjustment point,
$X_U$ and $Y_U$ are the original x and y coordinates of the upper adjustment point,
pivot is arbitrarily set to 50, and
contrast is the contrast setting specified by the user.

Figure 5:
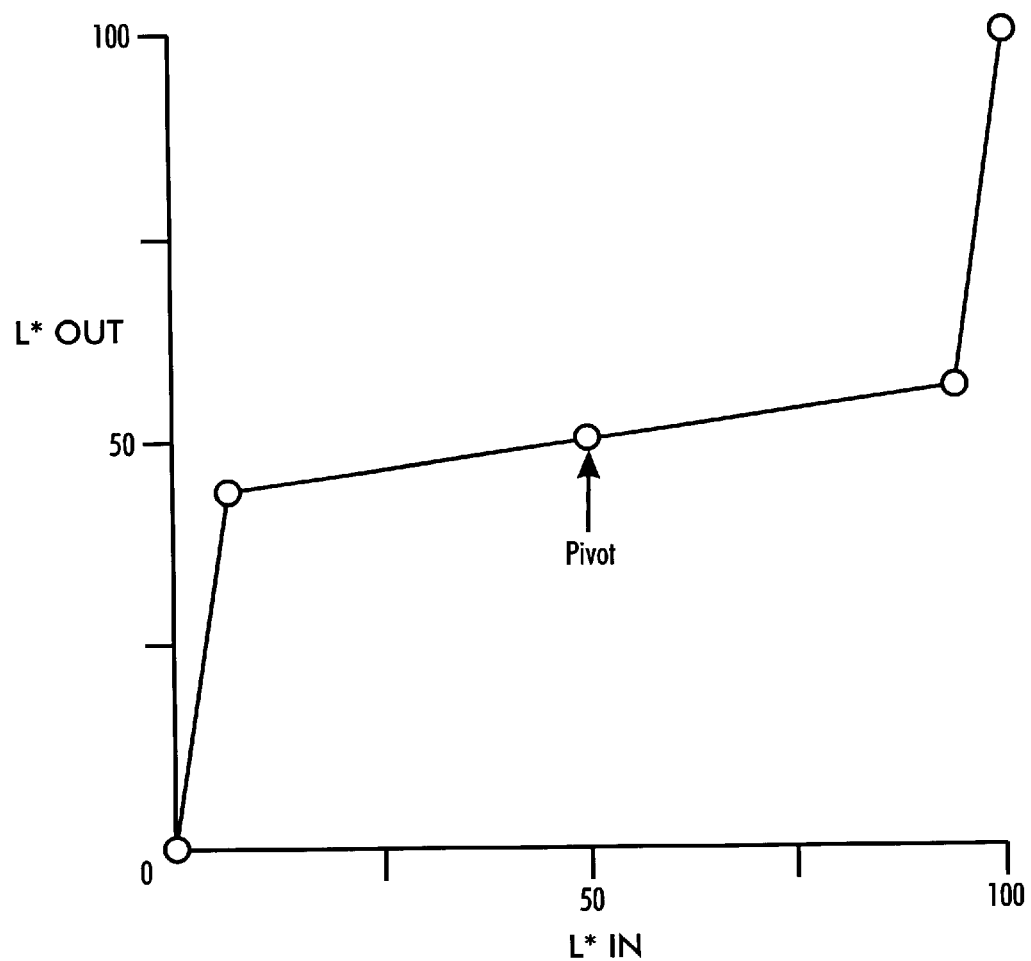
FIG. 5 is a plot illustrating an exemplary tone reproduction curve based on a low contrast setting.
Figure 6:
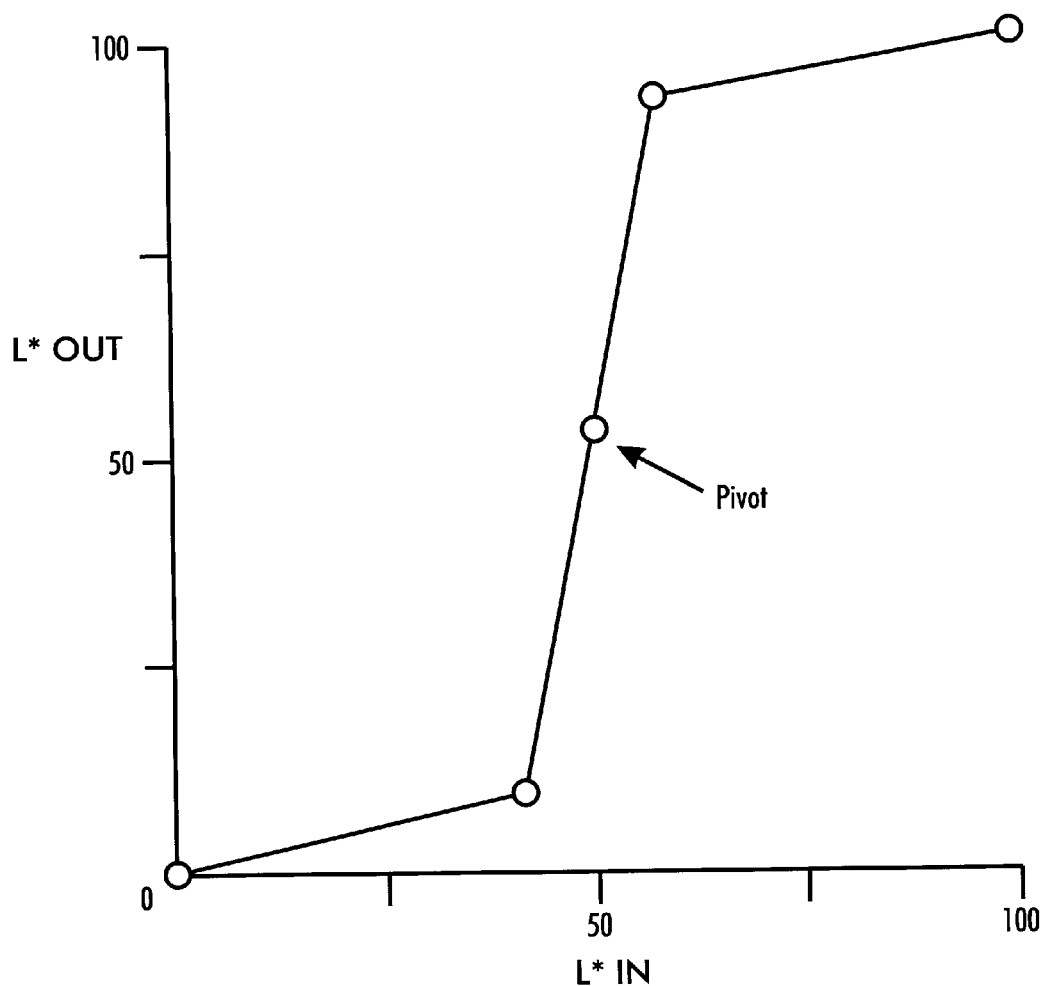
FIG. 6 is a plot illustrating an exemplary tone reproduction curve based on a high contrast setting.

The adjusted lower adjustment point and adjusted upper adjustment point are then manipulated within the initial contrast tone reproduction curve as shown in FIG. 2 to create a contrast adjusted tone reproduction curve. For example, FIG. 5 illustrates an adjusted tone reproduction curve that was determined based on a low value contrast setting. Alternatively, FIG. 6 illustrates an exemplary contrast adjusted tone reproduction curve based on high contrast values.

Figure 7:
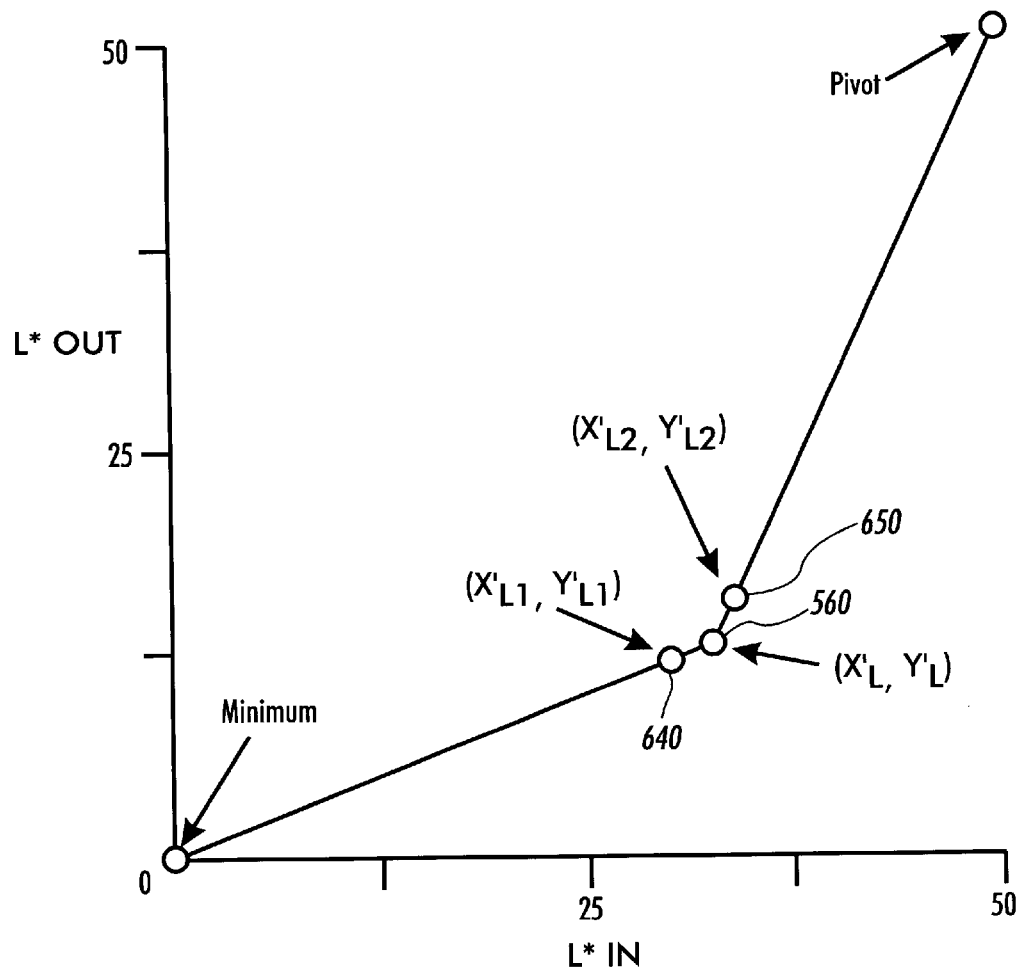
FIG. 7 is an exploded tone reproduction curve illustrating the lower adjustment point and its two replacement points.

At having determined the contrast adjusted tone reproduction curve, the contrast adjusted tone reproduction curve is smoothed such that the corners created by the adjustment process do not cause abrupt changes in the final system tone reproduction curve. These abrupt changes could cause contouring in the output image. Contouring is noise resulting from coarse amplitude quantizing such that artificial colors or boundaries develop and slowly varying regions of images that are truncated to a limited number of gray levels. By smoothing the contrast adjusted tone reproduction curve, the chances of contouring are reduced. In particular, the tone reproduction curve smoothing device 190 determines two new points for each one of the lower adjustment point and upper adjustment point. In particular, the tone reproduction curve smoothing device 190 divides the line segment between the minimum point and the pivot point into sixteen points. The two points that are closest to the adjustment point, and on either side, are selected. For example, and with reference to FIG. 7, a lower smoothing point 640 and an upper smoothing point 650 are determined for the lower adjustment point 560 in accordance with the following;

$$X'_{L1} = X'_L - \left(\frac{X'_L - \text{minimum}}{16}\right) \quad (5)$$

$$Y'_{L1} = Y'_L - \left(\frac{Y'_L - \text{minimum}}{16}\right) \quad (6)$$

$$X'_{L2} = X'_L + \left(\frac{\text{pivot} - X'_L}{16}\right) \quad (7)$$

$$Y'_{L2} = Y'_L + \left(\frac{\text{pivot} - Y'_L}{16}\right) \quad (8)$$

Figure 8:
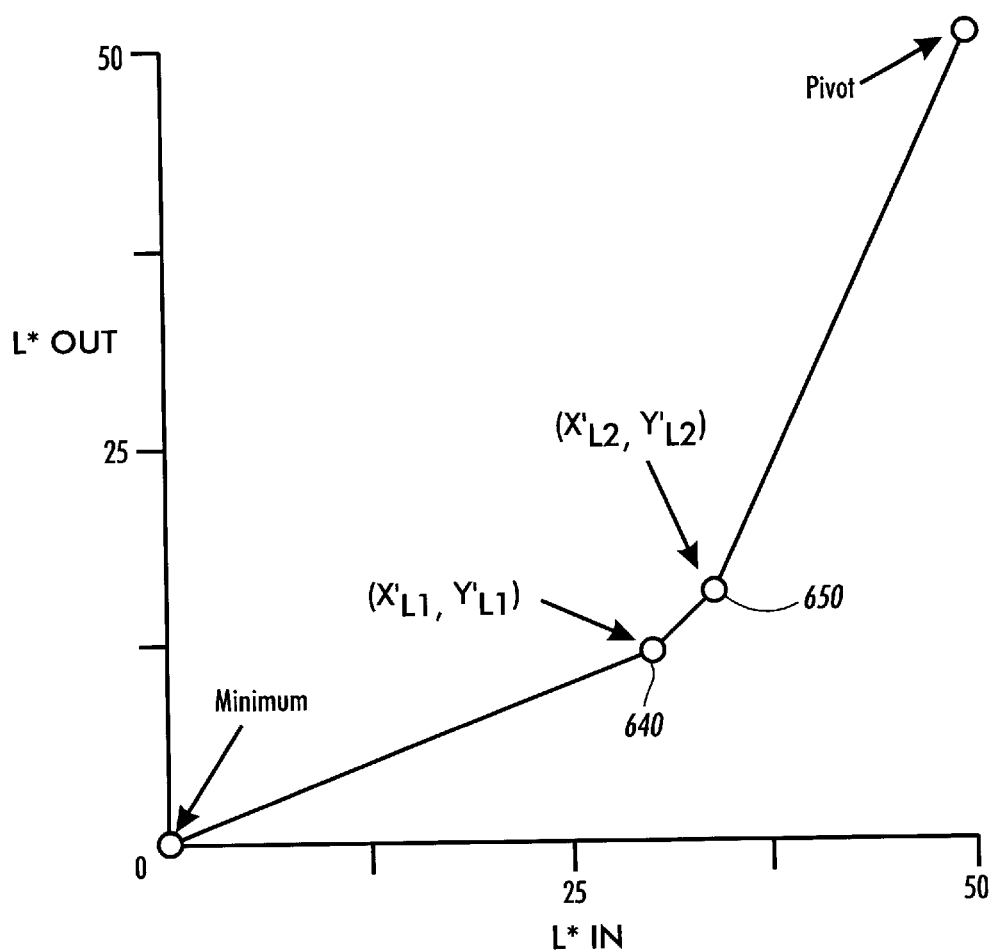
FIG. 8 is a plot illustrating an exploded tone reproduction curve showing the lower adjustment point replaced by the two placement points to produce a smooth adjusted tone reproduction curve.

The determined lower smoothing point 640 and upper smoothing point 650 are then used as replacements for the lower adjustment point 560 as shown in FIG. 8.

The tone reproduction smoothing device 190 then repeats the same process for the upper adjustment point 580. The end result is that a five point tone reproduction curve is smoothed into a seven point smooth tone reproduction curve.

However, it is due to be appreciated that while the above description is in relation to a five point reproduction curve, any number of points can be selected to increase the accuracy of the smooth tone reproduction curve.

The system tone reproduction curve is then cascaded through the smooth tone reproduction curve in the tone reproduction curve cascading device 200. Specifically, the tone reproduction curve cascading device 200 uses the smoothed tone reproduction curve as a look-up table and compares each point in a system curve to the smoothed tone reproduction curve. If a system curve point is equal to a smoothed curve point, then it is preserved in the final adjusted tone reproduction curve. Alternatively, if the system curve point is in between two points on the smoothed tone reproduction curve, then a new value is determined such that:

$$x' = x_1 + \left(\frac{(x_h - x_1) \times (y - y_1)}{(y_h - y_1)}\right) \quad (9)$$

x' and y are the x and y coordinates of the new point adjusted by the generic contrast TRC.

$x_l$ and $y_l$ are the x and y coordinates of the lower point on the generic contrast TRC, and $x_h$ and $y_h$ are the x and y coordinates of the higher point on the generic contrast TRC.

This results in the final adjusted tone reproduction curve.

Figure 9:
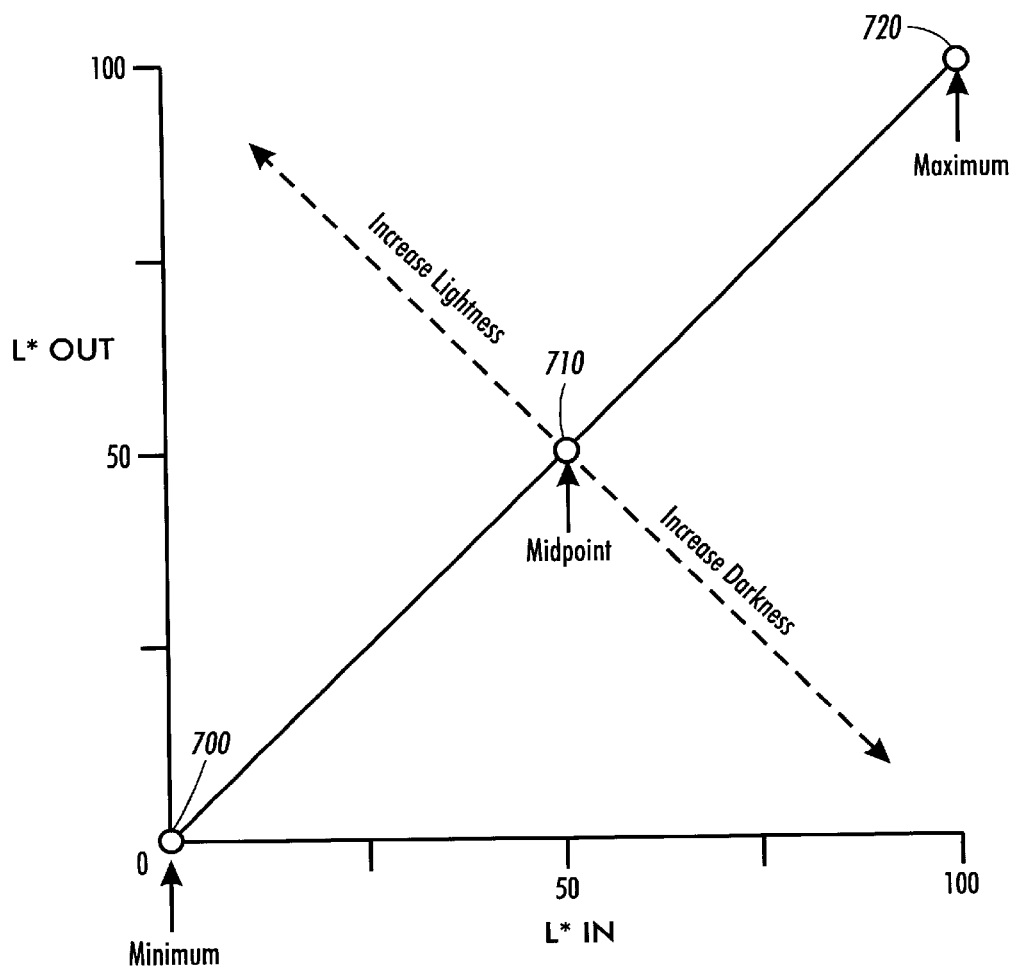
FIG. 9 is a plot illustrating an initial brightness tone reproduction curve.

Similar to the process used to make the contrast adjustments, brightness adjustments are made if the image processing selection contain brightness values. In particular, the brightness tone reproduction curve determination device 160 determines an initial brightness tone reproduction curve. As shown in FIG. 9, the initial brightness tone reproduction curve comprises a minimum point 700, a midpoint 710 and a maximum point 720. The three point initial brightness tone reproduction curve has a slope of 1 and a range of motion, based on a brightness value, is represented by the dotted line through the midpoint 710.

The minimum point 700, as with the contrast adjustment, is the lowest input and output point on the tone reproduction curve. The midpoint 710 is directly manipulated by the brightness settings and it adjusts all the values between the minimum point 700 and the maximum point 720. Similar to the pivot point for the contrast adjustment, the midpoint 710 can be set to any value between 0 and 100 L*. Positioning the midpoint 710 determines what range of values should be affected more by changes in brightness. However, unlike contrast, setting the midpoint 710 between 0 and 50 L* will cause lower brightness values to be affected more, and setting the midpoint 710 between 50 and 100 L* will affect higher brightness values more. Furthermore, as with the contrast adjustment, and for ease of discussion, the midpoint 710 has been arbitrarily set at (50, 50). The maximum point 720 is the highest input and output point on the tone reproduction curve.

The initial brightness tone reproduction curve is adjusted based on the brightness setting ranging, for example, from −10 to 10 corresponding to minimum brightness and maximum brightness, respectively. The midpoint 710 is adjusted to the resulting x and y coordinates by the coordinate determination device 180 according to:

$$X'_m = \left[X_m - \left(\frac{\text{brightness}}{0.25}\right)\right] \quad (10)$$

$$Y'_m = \left[Y_m + \left(\frac{\text{brightness}}{0.25}\right)\right] \quad (11)$$

where:

$X'_m$ and $Y'_m$ are the new x and y coordinates for the midpoint, $X_m$ and $Y_m$ are the original x and y coordinates for the midpoint, brightness is the brightness setting specified by the user, and.

0.25 is a constant that was derived through trial and error to produce desired the dynamic range for brightness.

Figure 10:
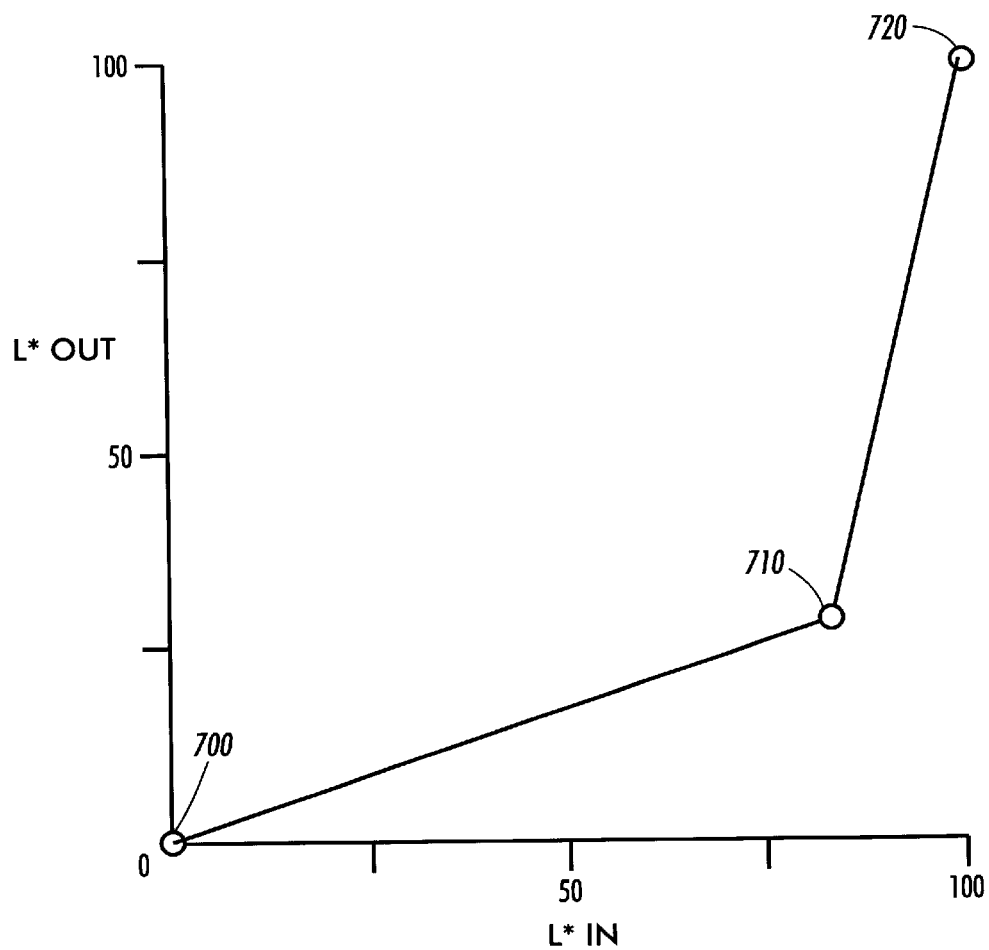
FIG. 10 is a plot illustrating an exemplary tone reproduction curve based on a low brightness setting.
Figure 11:
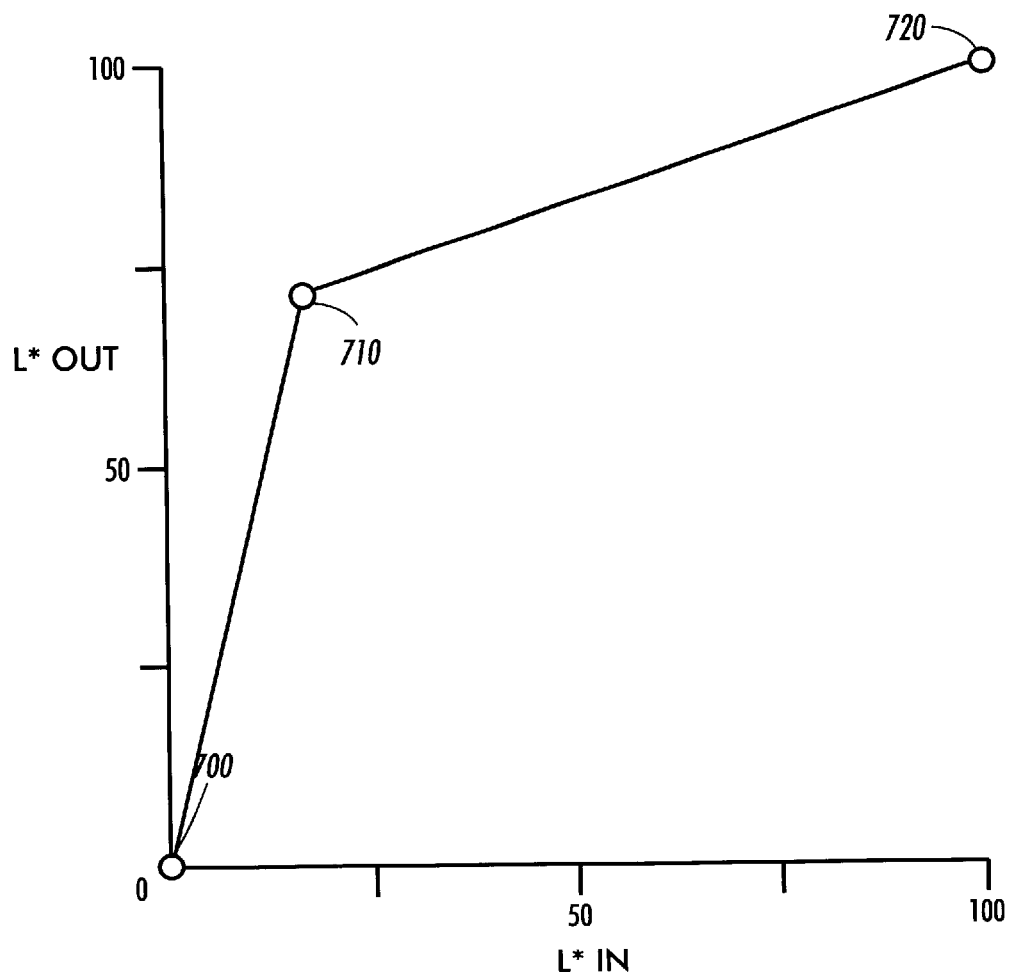
FIG. 11 is a plot of an exemplary tone reproduction curve based on a high brightness setting.

The resulting adjusted midpoint is combined with the initial brightness tone reproduction curve to create a brightness adjusted tone reproduction curve. For example, FIG. 10 illustrates an exemplary brightness adjusted tone reproduction curve based on low brightness values. Alternatively, FIG. 11 illustrates an exemplary brightness adjusted tone reproduction curve having high brightness values.

As with the previously described contrast adjustment process, the brightness adjusted tone reproduction curve is smoothed by the tone reproduction curve smoothing device 190. Furthermore, the tone reproduction curve cascading device 200 cascades the system tone reproduction curve through the smooth tone reproduction curve using the same interpolation method as described in relation to the contrast adjustment.

The image processing tone reproduction curve is then determined based on the system tone reproduction curve and the printer tone reproduction curve by the image processing device 210. This image processing tone reproduction curve is then used by the image processing device 210 to manipulate an image received from the image source 400 via link 105. The adjusted image can then be output with the cooperation I/O device 120 and link 105 to the image sink 500.

Figure 12:
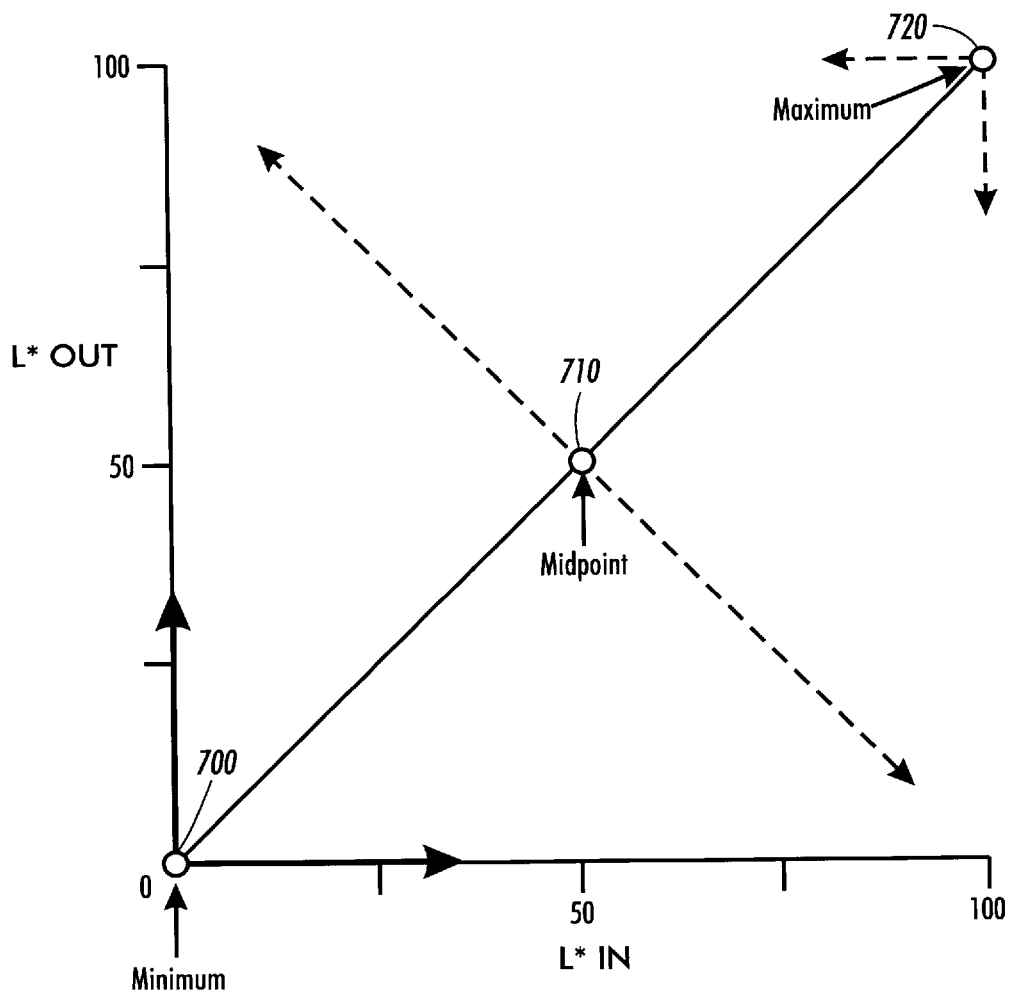
FIG. 12 is a plot of an exemplary generic brightness tone reproduction curve based on proportional brightness changes.

It is to be appreciated that alternative methods of adjusting the brightness tone reproduction curve are possible. In particular, and as illustrated in FIG. 12, it is possible to have the minimum point 700 and the maximum point 720 moved proportionally with brightness changes in the midpoint 710. This allows very dark and very light values to change proportional to changes in brightness.

Figure 13:
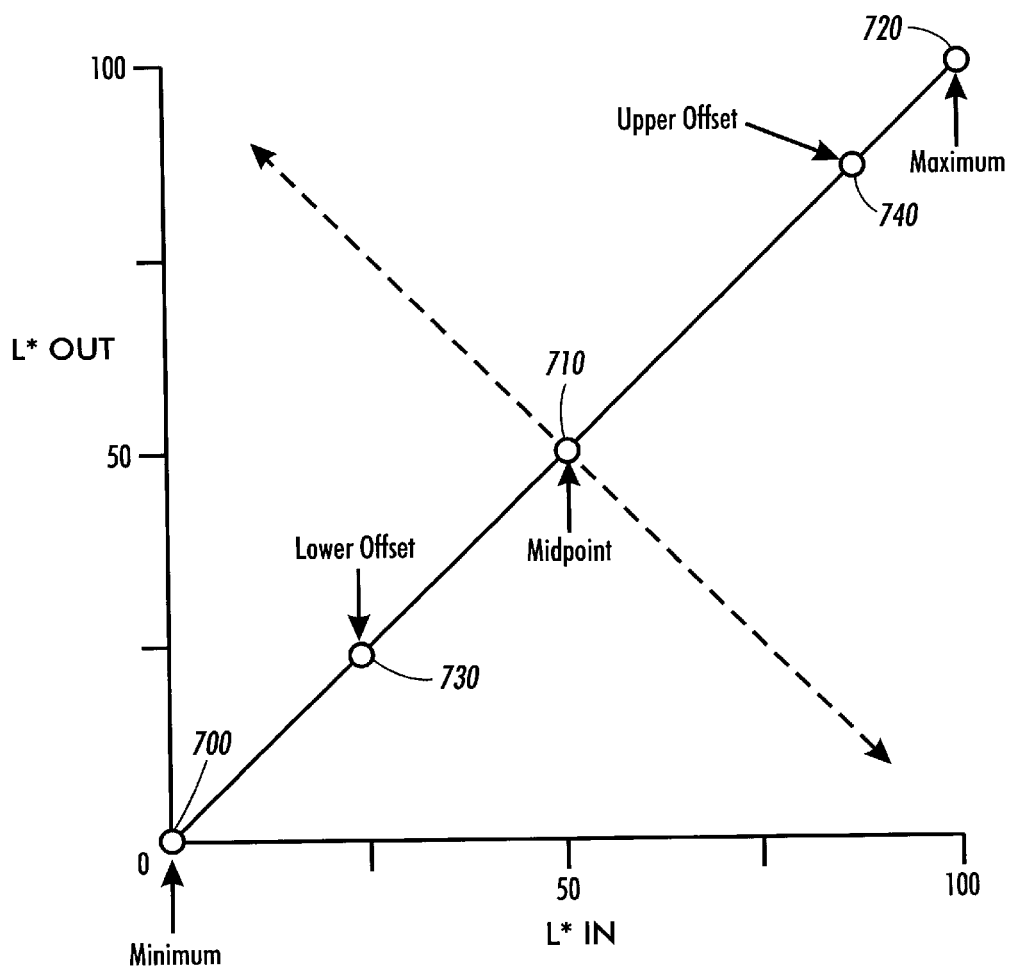
FIG. 13 is a plot illustrating a brightness tone reproduction curve having two new fixed points.

Alternatively, and with reference to FIG. 13, the minimum point 700 and the maximum point 720 can be fixed at (0, 0) and (100, 100), respectively, and two new fixed points, the lower offset point 730 and the upper offset point 740 added. The lower offset point 730 could be placed between the minimum point 700 and the midpoint 710 at a location determined by the system curve's black point, i.e., the point at which all values below it are at the darkest output level. The upper offset point 740 can be placed between the midpoint 710 and the maximum point 720 at a location determined by the system curve's white point, i.e., the point at which all values above it are at the brightest output level. The resulting tone reproduction curve would be 1:1 between the minimum point and the lower offset point 730, and between the upper offset point 740 and the maximum point 720 causing the corresponding values from the system curve to be preserved during cascading. This method allows for adjustments to affect only the mid range value between the lower offset point 730 and the upper offset point 740 in an image preserved darker and lighter values.

Figure 14:
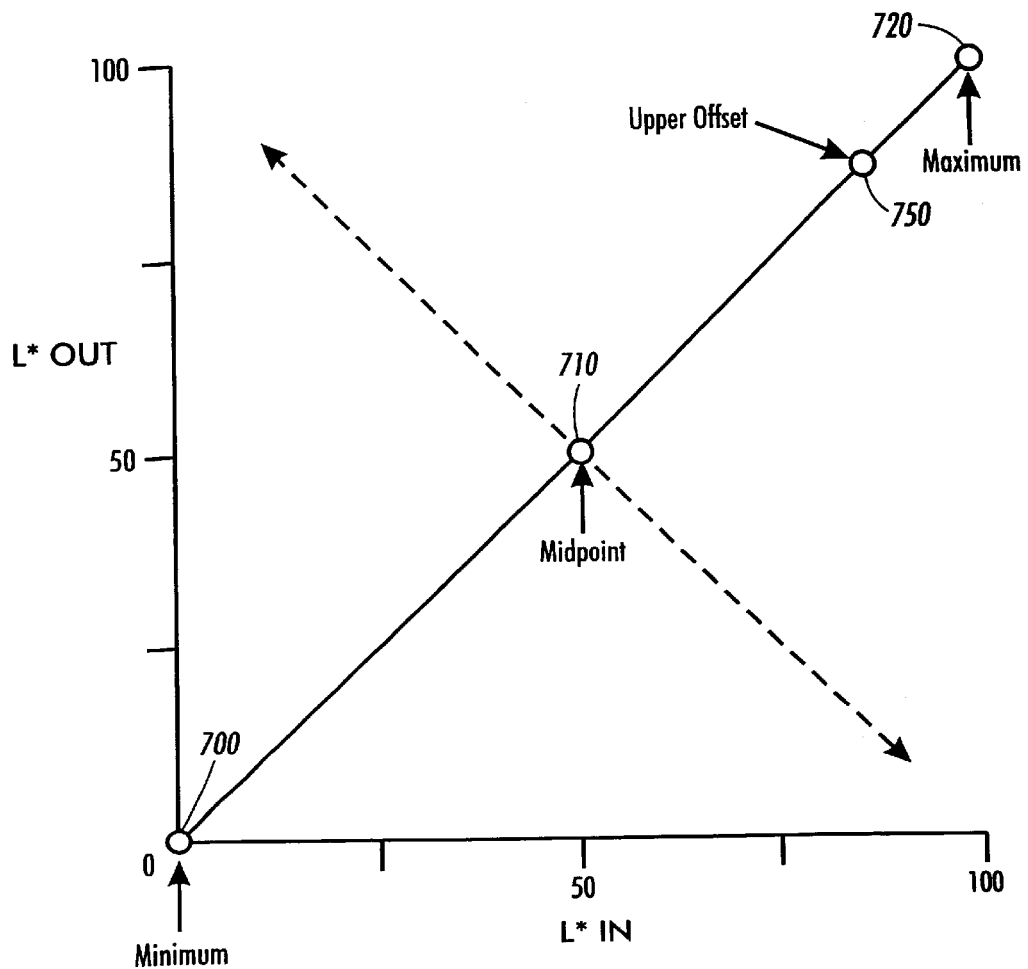
FIG. 14 is a plot of an exemplary brightness tone reproduction curve adding one new fixed point.

Furthermore, and with reference to FIG. 14, the minimum point 700 and maximum point 720 can be fixed, and one new upper offset point 750 added. The manipulation of the upper offset point 750, as discussed in relation to the manipulation of the upper offset point 740 described in relation to FIG. 13 allows for the lighter values in an image to be preserved, but causes darker values, excluding absolute black, to be adjusted. It is to be further appreciated a similar arrangement could be made with only a lower offset point and no upper offset point. This would result in darker values in an image to be preserved, but causing lighter values, excluding absolute white, would be adjusted.

Figure 15:
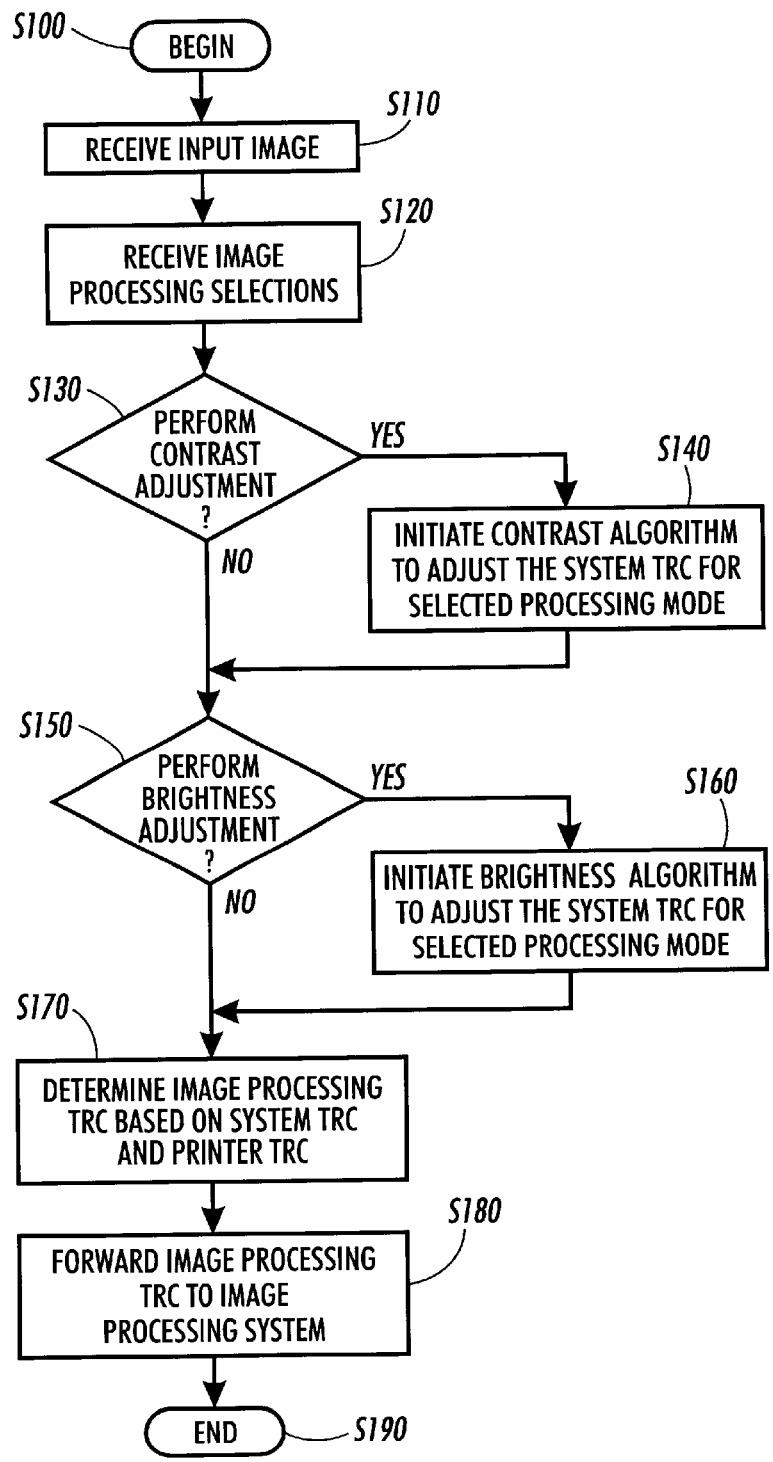
FIG. 15 is a flowchart outlining one exemplary embodiment of a method for determining a tone reproduction curve according to this invention.

FIG. 15 illustrates the operation of the image processing system according to this invention. Specifically, control begins in step S100. Next, in step S110, input image information is received. Then, in step S120, image processing selections, such as brightness adjustment values and contrast adjustment values are received. Control then continues to step S130.

In step S130, a determination is made whether to perform a contrast adjustment. If a contrast adjustment value has been received, control continues to step S140 where the contrast adjustment is performed. Control then continues to step S150. In step S150, a determination is made whether to perform a brightness adjustment. If brightness adjustment value has been received, control continues to step S160, otherwise control continues to step S170. In step S160, the brightness adjustment is performed and control continues to step S170.

In step S170, the image processing tone reproduction curve is determined based on the system tone reproduction curve and the IOT, e.g., a printer, tone reproduction curve, as discussed in Attorney Docket No. 105423, and any adjustment as discussed in co-pending Attorney Docket No. 105425, filed herewith and incorporated herein by reference in its entirety. Next, in step S180, the image processing tone reproduction curve is forwarded to the image processing system. Control then continues to step S190 where the control sequence ends.

Figure 16:
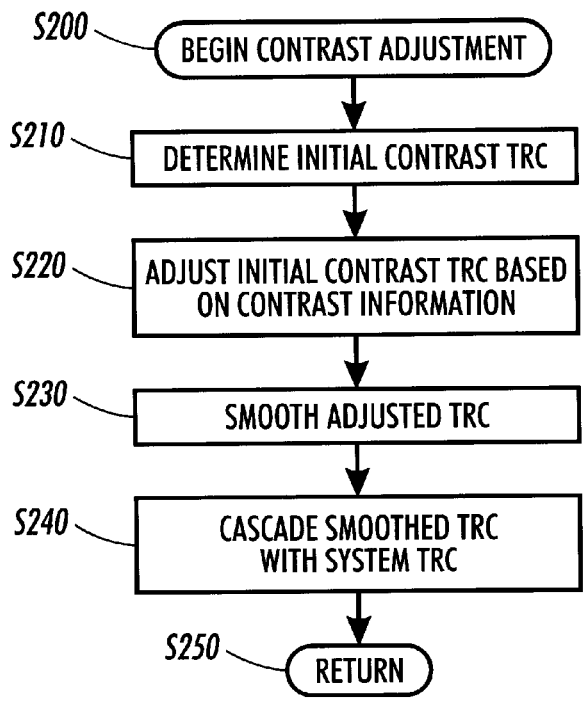
FIG. 16 illustrates in greater detail the contrast adjustments step of FIG. 15.

FIG. 16 illustrates in greater detail the contrast adjustment step S140 of FIG. 15. In particular, control begins in step S200 and continues to step S210. In step S210, an initial contrast tone reproduction curve is determined. Next, in step S220, the initial contrast tone reproduction curve is adjusted based on received contrast values. Then, in step S230, the adjusted tone reproduction curve is smoothed. Control then continues to step S240.

In step S240, the smoothed tone reproduction curve is cascaded with a system tone reproduction curve. Control then continues to step S250 where the control sequence returns to step S150.

Figure 17:
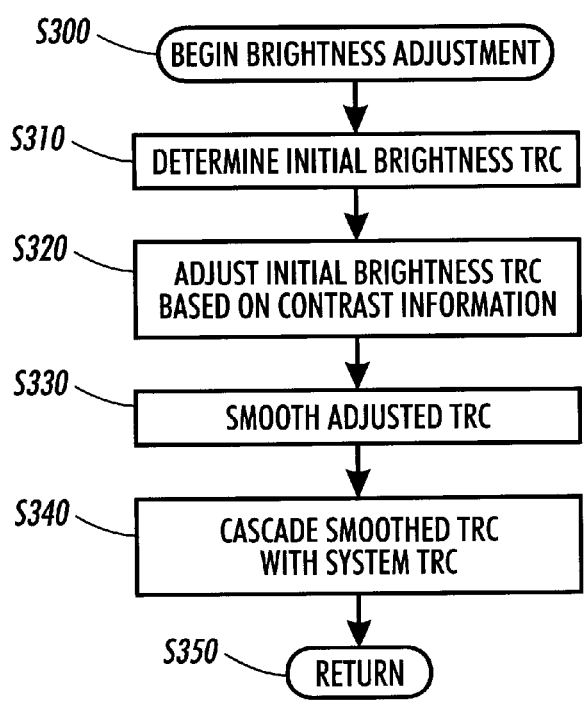
FIG. 17 illustrates in greater detail the brightness adjustment step of FIG. 15.

FIG. 17 illustrates, in greater detail, the brightness adjustment step S160 of FIG. 15. In particular, control begins in step S300 and continues to step S310. In step S310, an initial brightness tone reproduction curve is determined. Next, in step S320, the initial brightness tone reproduction curve is adjusted based on received brightness values. Then, in step S330, the adjusted tone reproduction curve is smoothed. Control then continues to step S340.

In step S340, the smoothed tone reproduction curve is cascaded with a system tone reproduction curve. Control then continues to step S350 where control returns to step S170.

As shown in FIG. 1, the contrast and brightness adjusted system tone reproduction curve systems and methods are preferably implemented either on a single program general purpose computer or separate programmed general purpose computer, with associated image source and image sink devices. However, the image contrast and a brightness adjusted system tone reproduction curve systems and methods can also be implemented on a special purpose computer, a programmed micro-processor or micro-controller and peripheral integrated circuit element, and ASIC or other integrated circuit, a digital signal processor, a hard-wired electronic or logic circuit such as a discrete element circuit, a programmable logic device such as a PLD, PLA, FPGA, PLA or the like. In general, any device capable of implementing a finite state machine that is in turn capable of implementing the flowcharts shown in FIG. 15–17 can be used to implement the image processing system according to this invention.

Furthermore, the disclosed method may be readily implemented in software using object or object-oriented software development environments that provide portable source code that can be used on a variety of computer or workstation hardware platforms. Alternatively, the disclosed image processing system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The image processing systems and methods described above, however, can be readily implemented in hardware or software using any known or later developed systems or structures, devices and/or software by those skilled in the applicable art without undo experimentation from the function of the described provided herein together with a general knowledge of the computer arts.

Moreover, the disclosed method may be readily implemented as software executed on a programmed general purpose computer, a special purpose computer, a microprocessor or the like. In this case, the methods and systems of this invention can be implemented as a routine embedded on a personal computer or as a resource residing on a server or graphics work station, such as a routine imbedded in a photocopier printer driver, or the like. The contrast and brightness adjusted system tone reproduction curve systems and methods can also be implemented by physically incorporating the systems and methods into a software and/or hardware system, such as the hardware and software system of a personal computer, a photocopier, or a dedicated information processing system.

It is, therefore, apparent that there has been provided in accordance with the present invention, systems and methods for determining an adjusted image processing system tone reproduction curve. While this invention has been described in conjunction with the preferred embodiments thereof, it is evident that many alternatives, modifications and variations be apparent to those skilled in the art. Accordingly, Applicants intend to embrace all such alternatives, modifications and variations that follow in the spirit and scope of this invention.

What is claimed is:

1. A system that determines a contrast and a brightness adjusted tone reproduction curve comprising:
   an input device that receives at least one of contrast and brightness information;
   at least one tone reproduction curve determination device that determines at least one of a contrast tone reproduction curve and a brightness tone reproduction curve; and
   a tone reproduction curve adjusting device that adjusts a tone reproduction curve based on the at least one determined contrast and brightness tone reproduction curves and determines an image processing tone reproduction curve.

2. The system of claim 1, further comprising a coordinate determination device that aligns the adjusted tone reproduction curve and a system tone reproduction curve.

3. The system of claim 1, further comprising a cascading device that cascades the adjusted tone reproduction curve with a system tone reproduction curve.

4. The system of claim 1, further comprising a tone reproduction curve smoothing device that smoothes the adjusted tone reproduction curve.

5. The system of claim 1, further comprising an image processing device that determines an image processing tone reproduction curve based on the adjusted tone reproduction curve and an output tone reproduction curve.

6. The system of claim 5, wherein the image processing device manipulates an image based on the image processing tone reproduction curve.

7. A method for determining a contrast and a brightness adjusted tone reproduction curve comprising:
   receiving at least one of contrast and brightness information;
   determining at least one of a contrast tone reproduction curve and a brightness tone reproduction curve; and
   adjusting a tone reproduction curve based on the at least one determined contrast and brightness tone reproduction curves and determining an image processing tone reproduction curve.

8. The method of claim 7, further comprising aligning the adjusted tone reproduction curve and a system tone reproduction curve.

9. The method of claim 7, further comprising cascading the adjusted tone reproduction curve with a system tone reproduction curve.

10. The method of claim 7, further comprising smoothing the adjusted tone reproduction curve.

11. The method of claim 7, further comprising determining an image processing tone reproduction curve based on the adjusted tone reproduction curve and an output tone reproduction curve.

12. The method of claim 11, wherein the image processing device manipulates an image based on the image processing tone reproduction curve.

13. An information storage medium comprising information that determines a contrast and a brightness adjusted tone reproduction curve comprising:
   information that receives at least one of contrast and brightness information;
   information that determines at least one of a contrast tone reproduction curve and a brightness tone reproduction curve; and
   information that adjusts a tone reproduction curve based on the at least one determined contrast and brightness tone reproduction curves and determines an image processing tone reproduction curve.

* * * * *